US012482394B2

(12) United States Patent
Lei

(10) Patent No.: US 12,482,394 B2
(45) Date of Patent: Nov. 25, 2025

(54) IMAGE PROCESSING METHOD AND APPARATUS, AND ELECTRONIC DEVICE

(71) Applicant: VIVO MOBILE COMMUNICATION CO., LTD., Dongguan (CN)

(72) Inventor: Zhao Lei, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 257 days.

(21) Appl. No.: 18/229,660

(22) Filed: Aug. 2, 2023

(65) Prior Publication Data

US 2023/0377503 A1 Nov. 23, 2023

Related U.S. Application Data

(63) Continuation of application No. PCT/CN2022/074651, filed on Jan. 28, 2022.

(30) Foreign Application Priority Data

Feb. 4, 2021 (CN) .......................... 202110156335.2

(51) Int. Cl.
*G09G 3/20* (2006.01)
*G09G 3/00* (2006.01)

(52) U.S. Cl.
CPC ........... *G09G 3/2007* (2013.01); *G09G 3/001* (2013.01); *G09G 2320/0233* (2013.01)

(58) Field of Classification Search
None
See application file for complete search history.

(56) References Cited

U.S. PATENT DOCUMENTS

| 2008/0056567 A1* | 3/2008 | Kwon ....................... G06T 5/40 |
| | | 382/168 |
| 2013/0342585 A1 | 12/2013 | Chun et al. |
| 2016/0360192 A1 | 12/2016 | Cheng et al. |

(Continued)

FOREIGN PATENT DOCUMENTS

| CN | 105991980 A | 10/2016 |
| CN | 108281110 A | 7/2018 |

(Continued)

OTHER PUBLICATIONS

International Search Report issued in corresponding International Application No. PCT/CN2022/074651, mailed Mar. 22, 2022, 8 pages.

(Continued)

*Primary Examiner* — Yingchun He
(74) *Attorney, Agent, or Firm* — IPX PLLC

(57) ABSTRACT

An image processing method, an electronic device and a non-transitory computer-readable storage medium are provided. The image processing method includes: obtaining a first grayscale value corresponding to each pixel in a first image and a second grayscale value corresponding to each pixel in a second image; and determining a compensation parameter according to the first grayscale value and the second grayscale value corresponding to each pixel. The compensation parameter is used for compensating for an image generated by augmented reality glasses. The first image is an image generated by the augmented reality glasses. The second image is an output image of the augmented reality glasses.

18 Claims, 3 Drawing Sheets

(56) References Cited

U.S. PATENT DOCUMENTS

| | | | |
|---|---|---|---|
| 2019/0011735 A1 | | 1/2019 | Tan et al. |
| 2020/0051483 A1 | | 2/2020 | Buckley |
| 2021/0214874 A1 | * | 7/2021 | Iancu .................. D06F 33/32 |

FOREIGN PATENT DOCUMENTS

| | | | | |
|---|---|---|---|---|
| CN | 109831658 A | | 5/2019 | |
| CN | 110301000 A | | 10/2019 | |
| CN | 110618528 A | * | 12/2019 | .............. G09G 3/02 |
| CN | 111487774 A | | 8/2020 | |
| CN | 112995645 A | | 6/2021 | |
| WO | 2016078559 A1 | | 5/2016 | |
| WO | 2017219433 A1 | | 12/2017 | |
| WO | 2020136306 A1 | | 7/2020 | |

OTHER PUBLICATIONS

First Office Action issued in corresponding CN Patent Application No. 202110156335.2, dated May 17, 2022, 9 pages.

Search Report issued in corresponding CN Patent Application No. 202110156335.2, mailed Nov. 16, 2022, 2 pages.

\* cited by examiner

IMAGE PROCESSING METHOD AND APPARATUS, AND ELECTRONIC DEVICE

CROSS-REFERENCE TO RELATED APPLICATIONS

This application is a continuation of International Application No. PCT/CN2022/074651, filed on Jan. 28, 2022, which claims priority to Chinese Patent Application No. 202110156335.2 filed on Feb. 4, 2021. The entire contents of each of the above-referenced applications are expressly incorporated herein by reference.

TECHNICAL FIELD

This application relates to the field of display technologies, and in particular, to an image processing method and apparatus, and an electronic device.

BACKGROUND

An Augmented Reality (AR) technology is a technology that calculates a location and an angle of a camera image in real time and adds a corresponding image. In recent years, the AR technology has developed rapidly and has been widely applied in consumer, medical, logistics, and other fields. AR glasses are a portable device recognized by the industry as one of the most suitable product carriers for the AR technology.

Currently, AR glasses are equipped with an optical transmitter and a waveguide plate. A light wave emitted from the optical transmitter needs to be diffracted in a plurality of waveguide plates to achieve image projection. However, diffraction of a light wave in different waveguide plates produces different degrees of attenuation, leading to a poor display effect of an output image of the waveguide plate, thus affecting an imaging effect.

SUMMARY

An objective of embodiments of this application is to provide an image processing method and apparatus, and an electronic device, which can resolve a technical problem that inconsistent attenuation degrees of a light wave in different waveguide plates affect an imaging effect.

To resolve the foregoing technical problem, this application is implemented as follows:

According to a first aspect, an embodiment of this application provides an image processing method, including:

obtaining a first grayscale value corresponding to each pixel in a first image and a second grayscale value corresponding to each pixel in a second image, where the first image is an image generated by augmented reality glasses, and the second image is an output image of the augmented reality glasses; and determining a compensation parameter according to the first grayscale value and the second grayscale value corresponding to each pixel, where the compensation parameter is used for compensating for an image generated by the augmented reality glasses.

According to a second aspect, an embodiment of this application provides an image processing apparatus, including:

an obtaining module, configured to obtain a first grayscale value corresponding to each pixel in a first image and a second grayscale value corresponding to each pixel in a second image, where the first image is an image generated by augmented reality glasses, and the second image is an output image of the augmented reality glasses; and a determining module, configured to determine a compensation parameter according to the first grayscale value and the second grayscale value corresponding to each pixel, where the compensation parameter is used for compensating for an image generated by the augmented reality glasses.

According to a third aspect, an embodiment of this application provides an electronic device, including a processor, a memory, and a program or an instruction stored in the memory and runnable on the processor, where when the program or the instruction is executed by the processor, the steps of the method according to the first aspect are implemented According to a fourth aspect, an embodiment of this application provides a readable storage medium, storing a program or an instruction, where when the program or the instruction is executed by a processor, the steps of the method according to the first aspect are implemented.

According to a fifth aspect, an embodiment of this application provides a chip, including a processor and a communication interface, where the communication interface is coupled to the processor, and the processor is configured to run a program or an instruction to implement the method according to the first aspect.

According to a sixth aspect, an embodiment of this application provides a computer program product, stored in a non-volatile storage medium, where the computer program product is executed by at least one processor to implement the steps of the method according to the first aspect.

According to a seventh aspect, an embodiment of this application provides an electronic device, configured to perform the steps of the method according to the first aspect.

In the embodiments of this application, a first grayscale value of each pixel in a first image is compared with a second grayscale value of each pixel in a second image, where the first image is an image generated by AR glasses, and a second image is an output image of the AR glasses. Then a compensation parameter is determined based on the first grayscale value and the second grayscale value, and an image generated by the AR glasses is compensated, to eliminate optical signal attenuation caused by diffraction of a light wave in a waveguide plate, thereby improving an imaging effect of an output image from the waveguide plate.

DETAILED DESCRIPTION

The technical solutions in embodiments of this application are clearly described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

In this specification and the claims of this application, the terms "first", "second", and so on are intended to distinguish similar objects, but do not necessarily indicate a specific order or sequence. It should be understood that the data termed in such a way is interchangeable in proper circumstances, so that the embodiments of this application can be implemented in other sequences than the sequence illustrated or described herein. In addition, "and/or" in this specification and the claims indicate at least one of the connected objects, and the character "/" usually indicates an "or" relationship between the associated objects.

An image processing method provided in the embodiments of this application is described in detail below through embodiments and application scenarios thereof with reference to the accompanying drawings.

Figure 1:
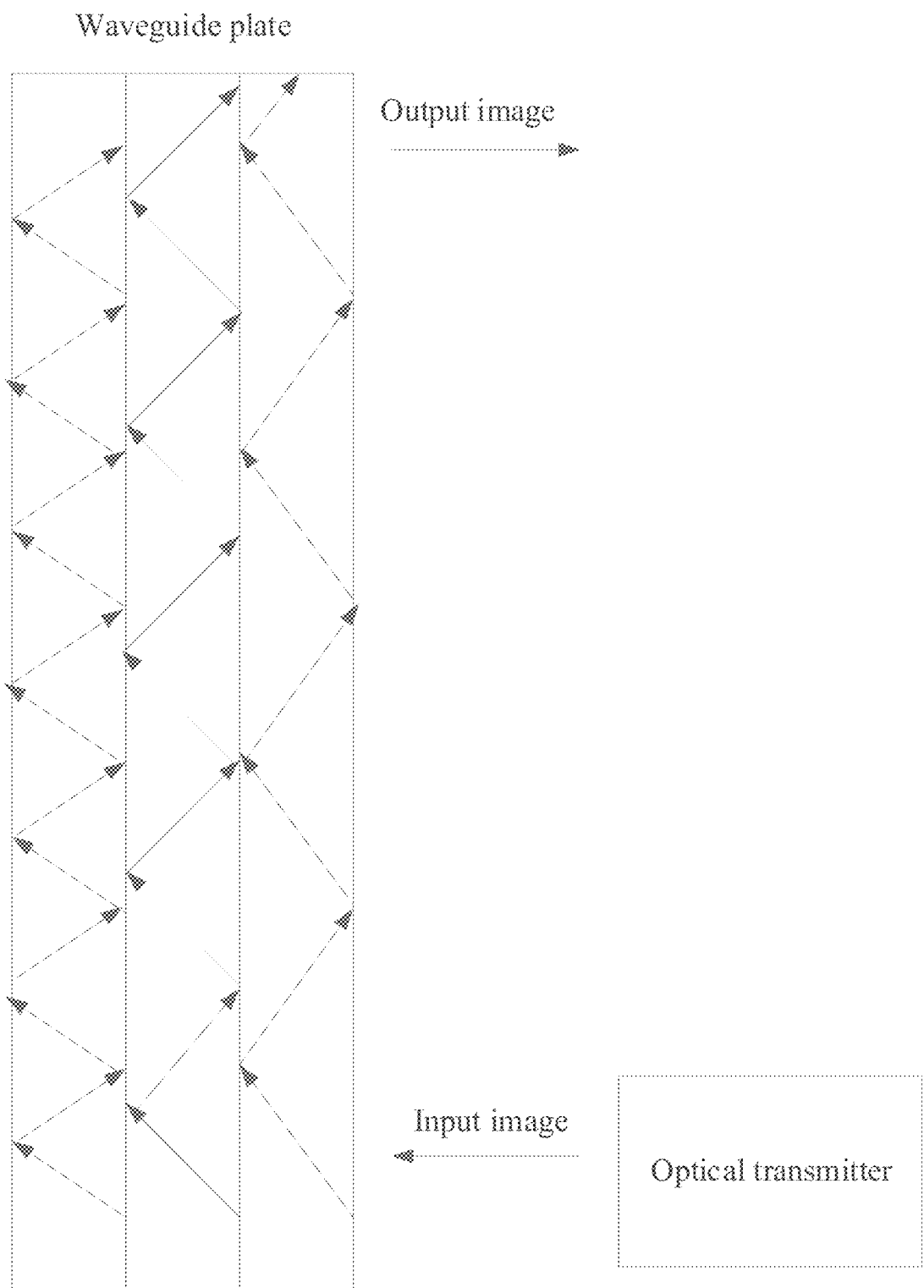
FIG. 1 is a schematic diagram of an application scenario of an image processing method according to an embodiment of this application.

FIG. 1 a schematic diagram of an application scenario of an image processing method according to an embodiment of this application.

An image processing apparatus shown in FIG. 1 may be AR glasses. It should be understood that, in some embodiments, the image processing apparatus may alternatively be a projector or other apparatuses.

The AR glasses include an optical transmitter and a waveguide plate set. The waveguide plate set includes at least three waveguide plates. The optical transmitter outputs an image to the waveguide plate set. It should be noted that, the optical transmitter outputs the image in a manner of outputting a light wave. Each color corresponds to a light wave with a different wavelength, and light waves corresponding to different colors propagate in different waveguide plates.

For example, a light wave corresponding to red propagates in a first waveguide plate, a light wave corresponding to green propagates in a second waveguide plate, and a light wave corresponding to blue propagates in the second waveguide plate. Due to different production processes of each waveguide plate, light waves transmitted in different waveguide plates have different attenuation, making output images of the waveguide plates inconsistent in color shades, thus affecting an imaging effect.

Based on the above possible technical problem, this application proposes the following technical idea:

A grayscale value of an output image of AR glasses is compared with a grayscale value of an image generated by the AR glasses, to adjust light-emitting parameters of the AR glasses to eliminate optical signal attenuation caused by diffraction of a light wave in a waveguide plate, thereby improving an imaging effect of an output image from the waveguide plate.

Figure 2:
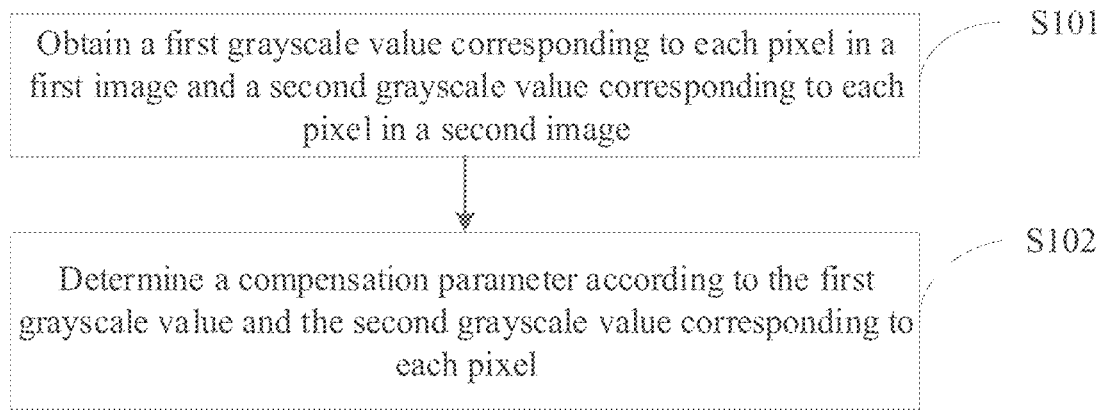
FIG. 2 is a flowchart of an image processing method according to an embodiment of this application.

FIG. 2 is a flowchart of an image processing method according to an embodiment of this application. The image processing method provided in this embodiment of this application includes the following steps:

S101. Obtain a first grayscale value corresponding to each pixel in a first image and a second grayscale value corresponding to each pixel in a second image.

In this step, the first image is an image generated by AR glasses, that is, the image generated and output by the optical transmitter in FIG. 1, or may be understood as an input image of a waveguide plate. The second image is an output image generated by the AR glasses. The second image may alternatively be understood as an output image of the waveguide plate. It should be understood that, the content of the first image is the same as the content of the second image.

It should be understood that, for a pixel in an image, light waves emitted at this pixel include at least three basic colors of red, green, and blue. Light waves of different colors propagate in different waveguide plates. Therefore, light waves emitted by the optical transmitter at a pixel may have different degrees of attenuation in different waveguide plates.

In this step, grayscale values of all pixels in the first image may be obtained through an image sensor or by reading related data of the output image stored in the optical transmitter. The grayscale value is also referred to as a first grayscale value. Grayscale values of all pixels in the second image may be obtained through the image sensor or by capturing the output image by using a camera. The grayscale value is also referred to as a second grayscale value.

In this step, a first table and a second table may be created. The first table includes a first grayscale value of each pixel. The second table includes a second grayscale value of each pixel. In this manner, a grayscale value change status of each pixel is intuitively displayed.

It should be understood that, the grayscale value reflects a color shade, and the grayscale value is in a range of 0 to 255. When a grayscale value of an image is 0, the image is a black image. When a grayscale value of an image is 255, the image is a white image.

S102. Determine a compensation parameter according to the first grayscale value and the second grayscale value corresponding to each pixel.

In this step, after the first grayscale value and the second grayscale value corresponding to each pixel are determined, a compensation parameter corresponding to the AR glasses may be determined. For a technical solution, refer to the subsequent embodiment. The image generated by the AR glasses is compensated through the compensation parameter. A compensation manner may be adjusting, based on the compensation parameter, a grayscale or brightness of the image generated by the AR glasses, to eliminate optical signal attenuation caused by diffraction of a light wave in the waveguide plate.

A compensation manner may be adjusting, based on a compensation parameter, a grayscale of a light wave emitted at each pixel by the AR glasses, to implement the elimination of optical signal attenuation.

The foregoing compensation manner may alternatively be adjusting, based on the compensation parameter, brightness of a light wave emitted at each pixel by the AR glasses, to implement the elimination of optical signal attenuation.

In an application scenario, a first grayscale value corresponding to each pixel of the image generated by the AR glasses is obtained, and the output image of the AR glasses is captured by using a camera, to obtain a second grayscale value corresponding to each pixel in the output image. Based on the first grayscale value and the second grayscale value corresponding to each pixel, a compensation parameter corresponding to the pixel is determined, and the compensation parameter is input into the optical transmitter. In a process of generating an image again by the optical transmitter, a grayscale or brightness of the image generated by the optical transmitter is adjusted according to the compensation parameter.

In this embodiment of this application, a first grayscale value of each pixel in a first image is compared with a second grayscale value of each pixel in a second image, where the first image is an image generated by AR glasses, and a second image is an output image of the AR glasses. Then a compensation parameter is determined based on the first grayscale value and the second grayscale value, and an image generated by the AR glasses is compensated, to eliminate optical signal attenuation caused by diffraction of a light wave in a waveguide plate, thereby improving an imaging effect of an output image from the waveguide plate.

In some embodiments, the determining a compensation parameter according to the first grayscale value and the second grayscale value corresponding to each pixel includes:

determining M target pixels in the first image and a compensation value corresponding to each of the target pixels according to first grayscale values and second grayscale values corresponding to all pixels in the first image, where M is a positive integer; and compensating for the M target pixels according to the M compensation values.

In this embodiment, if a light wave emitted at a pixel has optical signal attenuation during propagation in the waveguide plate, and a degree of the attenuation is beyond a preset range, the pixel may be defined as a target pixel, and a compensation value corresponding to the target pixel is determined based on an attenuation value corresponding to the target pixel. The attenuation value may be understood as an attenuation amount of a grayscale value of the target pixel. The compensation parameter includes compensation values corresponding to all target pixels.

Based on first grayscale values and second grayscale values corresponding to all pixels in the input image of the waveguide plate, M target pixels in the input image of the waveguide plate and a compensation value of each of the target pixels may be determined. The compensation value is an attenuated grayscale value of the target pixel during propagation. For a technical solution of determining a target pixel and determining a compensation value corresponding to the target pixel, refer to the subsequent embodiment.

It should be understood that, in a possible case, the target pixels are all pixels of the input image of the waveguide plate, that is, all the pixels of the input image of the waveguide plate have optical signal attenuation beyond a preset range. In this case, a value of M is a quantity of all the pixels in the input image of the waveguide plate. In another possible case, the target pixels are some pixels of the input image of the waveguide plate. In this case, a value of M is less than a quantity of all the pixels in the input image of the waveguide plate.

M is a positive integer. For technical solutions, refer to the subsequent embodiment.

In this embodiment, after the compensation value of each of the target pixels is obtained, a grayscale value of each of the target pixels may be adjusted based on the compensation value.

In an implementation, for any target pixel, a grayscale value of the target pixel may be first adjusted to a target grayscale value corresponding to the target pixel, to compensate for attenuation of an optical signal during propagation in the waveguide plate. The target grayscale value is a sum of a compensation value of the target pixel and a first grayscale value of the target pixel.

For example, a first grayscale value of a target pixel is 200, and a compensation value corresponding to the target pixel is 40. In this case, a grayscale value of the target pixel may be adjusted to 240, to implement compensation for optical signal attenuation.

In some embodiments, the determining M target pixels in the first image and a compensation value corresponding to each of the target pixels according to first grayscale values and second grayscale values corresponding to all pixels in the first image includes:

for any pixel, determining a third grayscale value corresponding to the pixel, where the third grayscale value is determined based on N light waves corresponding to the pixel and an attenuation value corresponding to each of the light waves, each of the light waves corresponds to a different wavelength, and N is a positive integer; determining an absolute value of a difference between a second grayscale value corresponding to the pixel and the third grayscale value as a grayscale difference; and in a case that the grayscale difference is greater than or equal to a preset threshold, determining the pixel as a target pixel, and determining the grayscale difference as a compensation value.

In this embodiment, the optical transmitter may emit at least one type of light wave at any pixel of the image generated by the AR glasses. It should be noted that, based on a principle of three primary colors for image generation, light waves corresponding to a pixel include at least three light waves: a red light wave, a green light wave, and a blue light wave. In addition, each light wave corresponds to a different wavelength, and different light waves are diffracted in different waveguide plates. As a result, light waves with different wavelengths correspond to different degrees of optical signal attenuation.

A third grayscale value corresponding to a pixel may be determined based on N light waves corresponding to the pixel and an attenuation value corresponding to each of the light waves. The attenuation value is used for representing an attenuation degree caused by the corresponding light wave based on transmission efficiency. A third grayscale value of a pixel is used for representing a grayscale value corresponding to the pixel in a case that optical signal attenuation is caused without impact of the waveguide plate.

For a technical solution of how to determine a third grayscale value, refer to the subsequent embodiment.

For any pixel of the input image of the waveguide plate, an absolute value of a difference between a second grayscale value corresponding to the pixel and a third grayscale value corresponding to the pixel may be determined as a grayscale difference. It should be understood that, a grayscale difference of a pixel may represent an amount of optical signal attenuation caused during diffraction, in the waveguide plate, of a light wave emitted at the pixel.

In a case that the grayscale difference is greater than or equal to a preset threshold, it indicates that an optical signal has a large amount of attenuation when the light wave emitted at the pixel is diffracted in the waveguide plate. In this case, the pixel is determined as a target pixel, and the grayscale difference is determined as a compensation value corresponding to the target pixel, to eliminate the optical signal attenuation caused by the diffraction of the light wave in the waveguide plate.

In a case that the grayscale difference is less than a preset threshold, it indicates that an attenuation degree of an optical signal falls within an appropriate range when the light wave emitted at the pixel is diffracted in the waveguide plate. In this case, there is no need to determine the pixel as a target pixel.

For example, a third grayscale value of a pixel is 240, and a second grayscale value is 200. In this case, an absolute value of a difference between the third grayscale value and the second grayscale value is 40. If the preset threshold is 10, the pixel may be determined as a target pixel. If the preset threshold is 50, the pixel is not a target pixel.

In some embodiments, the N light waves include a first light wave, a second light wave, and a third light wave, and the determining a third grayscale value corresponding to the pixel includes:

determining a product of a grayscale value of the first light wave and a corresponding first attenuation value as a first sub-grayscale value; determining a product of a grayscale value of the second light wave and a corresponding second attenuation value as a second sub-grayscale value; determining a product of a grayscale value of the third light wave and a corresponding third attenuation value as a third sub-grayscale value; and determining a sum of the first sub-grayscale value, the second sub-grayscale value, and the third sub-grayscale value as the third grayscale value.

As described above, light waves corresponding to a pixel may be three light waves: a red light wave, a green light wave, and a blue light wave. The red light wave may be referred to as a first light wave, the green light wave may be referred to as a second light wave, and the blue light wave may be referred to as a third light wave. Based on the foregoing content, propagation of each light wave in different waveguide plates causes a different degree of attenuation of the optical signal.

In this embodiment, in a case that a pixel corresponds to three light waves, grayscale values of a first light wave, a second light wave, and a third light wave are obtained, and the grayscale values of the three light waves are respectively multiplied by attenuation values corresponding to the light waves, to obtain a first sub-grayscale value corresponding to the first light wave, a second sub-grayscale value corresponding to the second light wave, and a third sub-grayscale value corresponding to the third light wave.

The attenuation value corresponding to each light wave may be a preset empirical value. The first sub-grayscale value represents a grayscale value obtained after attenuation of the first light wave. The second sub-grayscale value represents a grayscale value obtained after attenuation of the second light wave. The third sub-grayscale value represents a grayscale value obtained after attenuation of the third light wave.

A sum of the first sub-grayscale value, the second sub-grayscale value, and the third sub-grayscale value is determined as the third grayscale value corresponding to the pixel.

For example, the grayscale value of each of the first light wave, the second light wave, and the third light wave is 100, the attenuation value corresponding to each of the first light wave and the second light wave is 0.8, and the attenuation value corresponding to the third light wave is 0.7. In this case, it may be obtained that the first sub-grayscale value and the second sub-grayscale value are each 80, the third sub-grayscale value is 70, and thus the third grayscale value is 230.

It should be understood that, in some embodiments, a pixel may correspond to one light wave or two light waves. For example, a light wave emitted at a pixel is a red light wave. In this case, the foregoing technical solution is also applicable, a third grayscale value corresponding to the pixel can be obtained. This is not elaborated herein in this embodiment.

In some embodiments, after the compensating for the M target pixels, the method further includes:

in a case that the augmented reality glasses generate a third image, increasing a grayscale value corresponding to the third image.

In this embodiment, after the compensation parameter is determined, if the augmented reality glasses generate a third image, and the third image is an image different from the first image, a grayscale value corresponding to the third image is increased. In an implementation, a grayscale value at a target pixel in the third image may be increased, where the increased grayscale value is the compensation value.

The following describes how to obtain a first grayscale value corresponding to each pixel:

In some embodiments, the obtaining a first grayscale value corresponding to each pixel in a first image includes:

for any pixel of the first image, obtaining a first pixel value, a second pixel value, and a third pixel value of the pixel; calculating a first product of the first pixel value and a corresponding first weight value, a second product of the second pixel value and a corresponding second weight value, and a third product of the third pixel value and a corresponding third weight value; and determining an average value of the first product, the second product, and the third product as a first grayscale value of the pixel.

It should be understood that, in some embodiments, a grayscale value of each pixel may be directly obtained by using an image sensor.

In this embodiment, a grayscale value of a pixel may be determined based on a first pixel value, a second pixel value, and a third pixel value of the pixel.

A pixel value of a pixel is an RGB value of the pixel. A first pixel value may be understood as an R value; a second pixel value may be understood as a G value; and a third pixel value may be understood as a B value.

It should be noted that, if a first pixel value, a second pixel value, and a third pixel value of an image are each 255, it indicates that the image is a white image; if a first pixel value, a second pixel value, and a third pixel value of an image are each 0, it indicates that the image is a black image; and if a first pixel value, a second pixel value, and a third pixel value of an image are equal, and none of the three pixel values is 255 or 0, it indicates that the image is a grayscale image.

In an implementation, a first product of a first pixel value of a pixel and a first weight value, a second product of a second pixel value and a second weight value, and a third product of a third pixel value and a third weight value are obtained, and an average value the first product, the second product, and the third product is determined as a first grayscale value of the pixel. The first weight value, the second weight value, and the third weight value are each an empirical value and may be customized. This is not specifically limited herein in this embodiment.

For example, a first pixel value of a pixel is 230, and a first weight value is 0.8; a second pixel value is 240, and a second weight value is 0.7; and a third pixel value is 200, and a third weight value is 0.6. In this case, it can be obtained through calculation that a first product is 184, a second product is 168, a third product is 120, and a first grayscale value of the pixel is 124.

Figure 3:
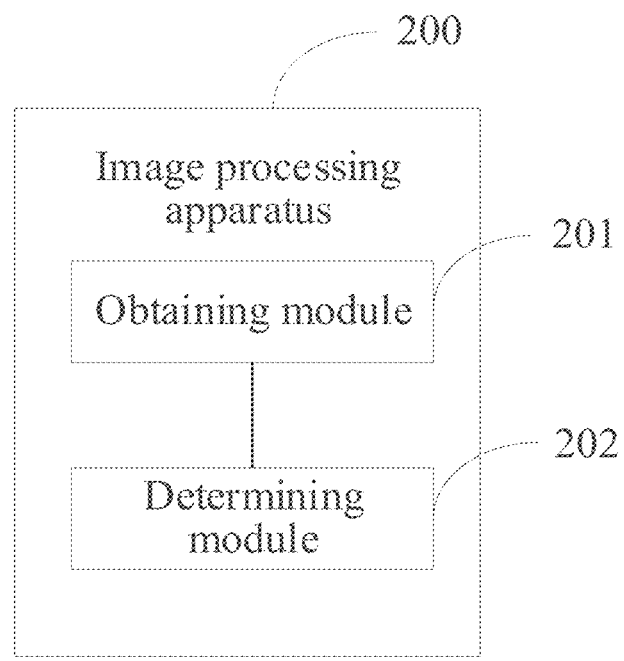
FIG. 3 is a structural diagram of an image processing apparatus according to an embodiment of this application.

As shown in FIG. 3, an image processing apparatus 200 includes:

an obtaining module 201, configured to obtain a first grayscale value corresponding to each pixel in a first image and a second grayscale value corresponding to each pixel in a second image; and a determining module 202, configured to determine a compensation parameter according to the first grayscale value and the second grayscale value corresponding to each pixel.

In some embodiments, the determining module 201 further includes:
- a determining unit, configured to determine M target pixels in the first image and a compensation value corresponding to each of the target pixels according to first grayscale values and second grayscale values corresponding to all pixels in the first image, where M is a positive integer; and
- a compensation unit, configured to compensate for the M target pixels according to the M compensation values.

In some embodiments, the determining unit is further configured to:
- for any pixel, determine a third grayscale value corresponding to the pixel, where the third grayscale value is determined based on N light waves corresponding to the pixel and an attenuation value corresponding to each of the light waves, each of the light waves corresponds to a different wavelength, and N is a positive integer;
- determine an absolute value of a difference between a second grayscale value corresponding to the pixel and the third grayscale value as a grayscale difference; and
- in a case that the grayscale difference is greater than or equal to a preset threshold, determine the pixel as a target pixel, and determine the grayscale difference as a compensation value.

In some embodiments, the determining unit is further configured to:
- determine a product of a grayscale value of the first light wave and a corresponding first attenuation value as a first sub-grayscale value;
- determine a product of a grayscale value of the second light wave and a corresponding second attenuation value as a second sub-grayscale value;
- determine a product of a grayscale value of the third light wave and a corresponding third attenuation value as a third sub-grayscale value; and
- determine a sum of the first sub-grayscale value, the second sub-grayscale value, and the third sub-grayscale value as the third grayscale value.

In some embodiments, the image processing apparatus 200 further includes:
- an increase module, configured to: in a case that the augmented reality glasses generate a third image, increase a grayscale value corresponding to the third image.

In some embodiments, the obtaining module 201 is further configured to:
- for any pixel of the first image, obtain a first pixel value, a second pixel value, and a third pixel value of the pixel;
- calculate a first product of the first pixel value and a corresponding first weight value, a second product of the second pixel value and a corresponding second weight value, and a third product of the third pixel value and a corresponding third weight value; and
- determine an average value of the first product, the second product, and the third product as a first grayscale value of the pixel.

The image processing apparatus in this embodiment of this application may be AR glasses or other projection devices, or may be a mobile terminal, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a Personal Computer (PC), a Television (TV), a teller machine, or an automated machine. This is not specifically limited in this embodiment of this application.

The image processing apparatus in this embodiment of this application may be an apparatus with an operating system. The operating system may be an Android operating system, an iOS operating system, or another possible operating system. This is not specifically limited in this embodiment of this application.

The image processing apparatus provided in this embodiment of this application can implement the processes implemented by the image processing method in the method embodiment of FIG. 2. To avoid repetition, details are not described herein again.

In this embodiment of this application, a first grayscale value of each pixel in a first image is compared with a second grayscale value of each pixel in a second image, where the first image is an image generated by AR glasses, and a second image is an output image of the AR glasses. Then a compensation parameter is determined based on the first grayscale value and the second grayscale value, and an image generated by the AR glasses is compensated, to eliminate optical signal attenuation caused by diffraction of a light wave in a waveguide plate, thereby improving an imaging effect of an output image from the waveguide plate.

For example, an embodiment of this application further provides an electronic device, including a processor 310, a memory 309, and a program or an instruction stored in the memory 309 and runnable on the processor 310. When the program or the instruction is executed by the processor 310, the processes of the embodiment of the foregoing image processing method are implemented, and the same technical effects can be achieved. To avoid repetition, details are not described herein again.

It should be noted that, the electronic device in this embodiment of this application includes the mobile electronic device and the non-mobile electronic device described above.

Figure 4:
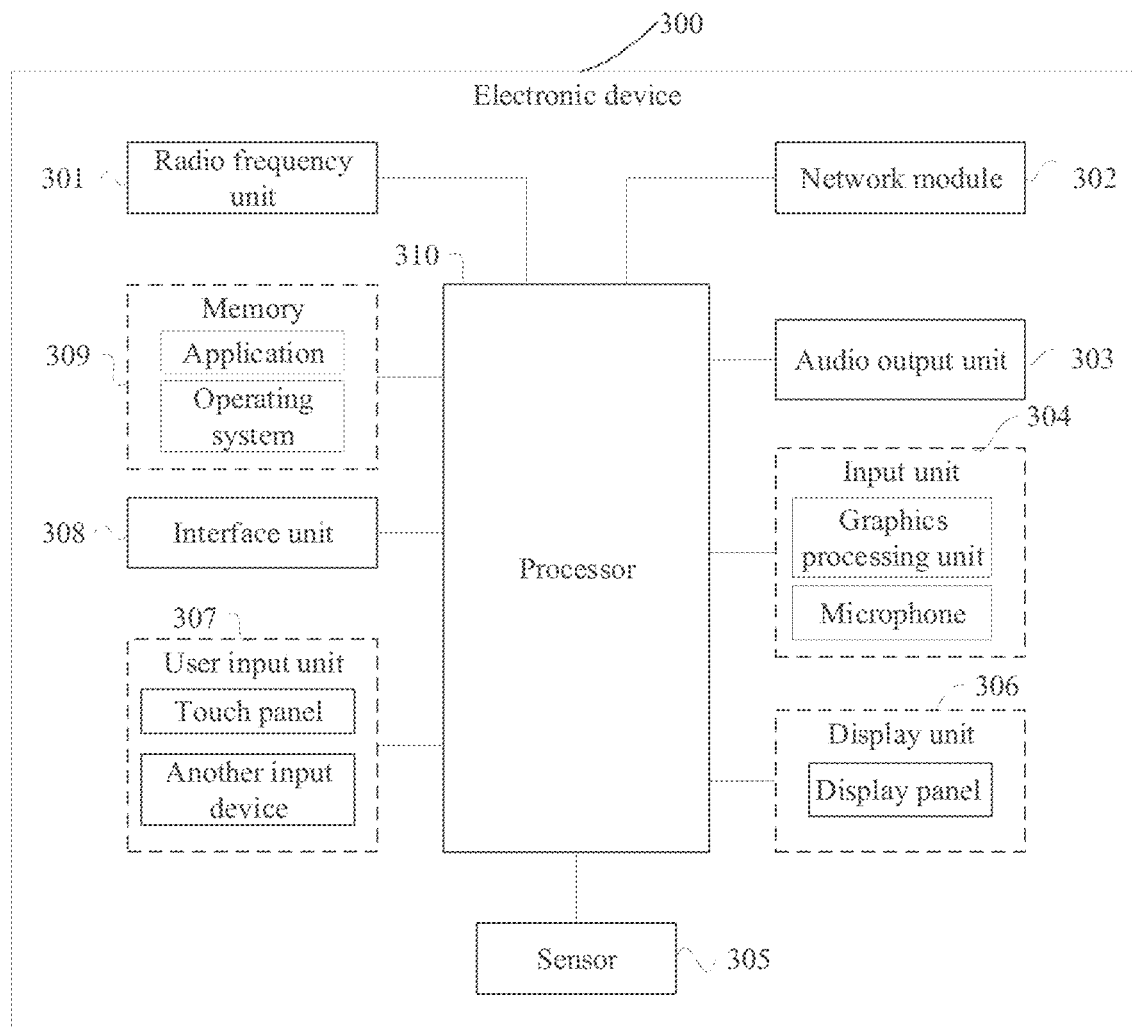
FIG. 4 is a structural diagram of an electronic device according to an embodiment of this application.

FIG. 4 is a schematic diagram of a hardware structure of an electronic device for implementing an embodiment of this application.

The electronic device 300 includes, but is not limited to: a radio frequency unit 301, a network module 302, an audio output unit 303, an input unit 304, a sensor 305, a display unit 306, a user input unit 307, an interface unit 308, a memory 309, a processor 310, and other components.

A person skilled in the art may understand that, the electronic device 300 may further include a power supply (such as a battery) for supplying power to each component. The power supply may be logically connected to the processor 310 by using a power management system, thereby implementing functions, such as charging, discharging, and power consumption management, by using the power management system. The structure of the electronic device shown in FIG. 4 does not constitute any limitation on the electronic device. The electronic device may include more or fewer components than those shown in the figure, or some components may be combined, or different component deployments may be used. Details are not described herein again.

The processor 310 is configured to obtain a first grayscale value corresponding to each pixel in a first image and a second grayscale value corresponding to each pixel in a second image; and determine a compensation parameter according to the first grayscale value and the second grayscale value corresponding to each pixel.

In some embodiments, the processor 310 is further configured to determine M target pixels in the first image and a compensation value corresponding to each of the target pixels according to first grayscale values and second grayscale values corresponding to all pixels in the first image; and compensate for the M target pixels according to the M compensation values.

In some embodiments, the processor 310 is further configured to: for any pixel, determine a third grayscale value corresponding to the pixel;

determine an absolute value of a difference between a second grayscale value corresponding to the pixel and the third grayscale value as a grayscale difference; and in a case that the grayscale difference is greater than or equal to a preset threshold, determine the pixel as a target pixel, and determine the grayscale difference as a compensation value.

In some embodiments, the processor 310 is further configured to determine a product of a grayscale value of the first light wave and a corresponding first attenuation value as a first sub-grayscale value;

determine a product of a grayscale value of the second light wave and a corresponding second attenuation value as a second sub-grayscale value;

determine a product of a grayscale value of the third light wave and a corresponding third attenuation value as a third sub-grayscale value; and determine a sum of the first sub-grayscale value, the second sub-grayscale value, and the third sub-grayscale value as the third grayscale value.

In some embodiments, the processor 310 is further configured to: in a case that augmented reality glasses generate a third image, increase a grayscale value corresponding to the third image.

In some embodiments, the processor 310 is further configured to: for any pixel of the first image, obtain a first pixel value, a second pixel value, and a third pixel value of the pixel;

calculate a first product of the first pixel value and a corresponding first weight value, a second product of the second pixel value and a corresponding second weight value, and a third product of the third pixel value and a corresponding third weight value; and determine an average value of the first product, the second product, and the third product as a first grayscale value of the pixel.

In this embodiment of this application, a first grayscale value of each pixel in a first image is compared with a second grayscale value of each pixel in a second image, where the first image is an image generated by AR glasses, and a second image is an output image of the AR glasses. Then a compensation parameter is determined based on the first grayscale value and the second grayscale value, and an image generated by the AR glasses is compensated, to eliminate optical signal attenuation caused by diffraction of a light wave in a waveguide plate, thereby improving an imaging effect of an output image from the waveguide plate.

An embodiment of this application further provides a readable storage medium, storing a program or an instruction, where when the program or the instruction is executed by a processor, the processes of the embodiment of the foregoing image processing method are implemented and the same technical effects can be achieved. To avoid repetition, details are not described herein again.

The processor may be the processor in the electronic device described in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip, including a processor and a communication interface, where the communication interface is coupled to the processor, and the processor is configured to run a program or an instruction, to implement the processes in the embodiment of the foregoing image processing method, and the same technical effects can be achieved. To avoid repetition, details are not described herein again.

It should be understood that, the chip mentioned in this embodiment of this application may also be referred to as a system on a chip, a system chip, a chip system, a system-on-chip, or the like.

An embodiment of this application provides a computer program product, stored in a non-volatile storage medium, where the computer program product is executed by at least one processor to implement the processes of the foregoing method embodiment and the same technical effects can be achieved. To avoid repetition, details are not described herein again.

An embodiment of this application provides an electronic device, configured to perform the processes of the embodiments of the foregoing method, and the same technical effects can be achieved. To avoid repetition, details are not described herein again.

It should be noted that, the term "include", "comprise", or any other variation thereof in this specification is intended to cover a non-exclusive inclusion, so that a process, method, article, or device including a series of elements includes not only those elements but also other elements not explicitly listed, or elements inherent to such a process, method, article, or device. Without more restrictions, the elements defined by the sentence "including a . . . " do not exclude the existence of other identical elements in the process, method, article, or device including the elements. In addition, it should be noted that, the scope of the methods and apparatuses in the implementations of this application is not limited to performing the functions in the order shown or discussed, but may further include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions in the foregoing implementations, a person skilled in the art may clearly learn that the method according to the foregoing embodiment may be implemented by software plus a necessary universal hardware platform, or by using hardware. In some embodiments, the technical solutions of this application entirely or the part contributing to the prior art may be implemented in the form of a software product. The computer software product is stored in a storage medium (such as a ROM/RAM, a magnetic disk, or an optical disc), and includes several instructions for causing a terminal (which may be a mobile phone, a computer, a server, a network device, or the like) to perform the method described in the embodiments of this application.

The embodiments of this application have been described above with reference to the accompanying drawings, but this application is not limited to the foregoing implementations. The foregoing implementations are only illustrative and not restrictive. Under the inspiration of this application, without departing from the purpose of this application and the scope of protection of the claims, a person of ordinary skill in the art can still make many forms, which all fall within the protection of this application.

What is claimed is:

1. An image processing method, performed by augmented reality glasses, comprising:
   obtaining a first grayscale value corresponding to each pixel in a first image and a second grayscale value corresponding to each pixel in a second image, wherein the first image is an image generated by the augmented reality glasses, and the second image is an output image of the augmented reality glasses; and
   determining a compensation parameter according to the second grayscale value corresponding to each pixel, wherein the compensation parameter is used for compensating for the image generated by the augmented reality glasses,
   wherein the determining a compensation parameter for the first image according to the second grayscale value comprises:
   determining M target pixels in the first image and a compensation value corresponding to each of the target pixels, according to second grayscale values corresponding to all pixels in the first image, wherein M is a positive integer, comprising:
   for each pixel, determining a third grayscale value corresponding to the pixel, based on N light waves corresponding to the pixel and an attenuation value corresponding to each of the light waves, each of the light waves corresponds to a different wavelength, and N is a positive integer:
   determining an absolute value of a difference between the second grayscale value corresponding to the pixel and the third grayscale value as a grayscale difference; and
   when the grayscale difference is greater than or equal to a preset threshold, determining the pixel as a target pixel in the first image, and determining the grayscale difference as the compensation value of the target pixel.

2. The image processing method according to claim 1, wherein the determining a compensation parameter according to second grayscale value corresponding to each pixel further comprises:
   compensating for the M target pixels according to the M compensation values.

3. The image processing method according to claim 2, wherein the compensating for the M target pixels according to the M compensation values comprises:
   adjusting a grayscale value of the target pixel to a target grayscale value, wherein target grayscale value is a sum of the compensation value of the target pixel and the first grayscale value of the target pixel.

4. The image processing method according to claim 2, wherein after the compensating for the M target pixels, the method further comprises:
   when the augmented reality glasses generate a third image, increasing a grayscale value corresponding to the third image, wherein a grayscale value increased for the third image is the compensation value.

5. The image processing method according to claim 1, wherein the N light waves comprise a first light wave, a second light wave, and a third light wave, and the determining a third grayscale value corresponding to the pixel comprises:
   determining a product of a grayscale value of the first light wave and a corresponding first attenuation value as a first sub-grayscale value;
   determining a product of a grayscale value of the second light wave and a corresponding second attenuation value as a second sub-grayscale value;
   determining a product of a grayscale value of the third light wave and a corresponding third attenuation value as a third sub-grayscale value; and
   determining a sum of the first sub-grayscale value, the second sub-grayscale value, and the third sub-grayscale value as the third grayscale value.

6. The image processing method according to claim 1, wherein the obtaining a first grayscale value corresponding to each pixel in a first image comprises:
   for each pixel of the first image, obtaining a first pixel value, a second pixel value, and a third pixel value of the pixel;
   calculating a first product of the first pixel value and a corresponding first weight value, a second product of the second pixel value and a corresponding second weight value, and a third product of the third pixel value and a corresponding third weight value; and
   determining an average value of the first product, the second product, and the third product as the first grayscale value of the pixel.

7. An electronic device, comprising a processor; and a memory having a computer program or an instruction stored thereon, wherein the computer program or the instruction, when executed by the processor, causes the processor to perform an image processing method, comprising:
   obtaining a first grayscale value corresponding to each pixel in a first image and a second grayscale value corresponding to each pixel in a second image, wherein the first image is an image generated by the augmented reality glasses, and the second image is an output image of the augmented reality glasses; and
   determining a compensation parameter according to the second grayscale value corresponding to each pixel, wherein the compensation parameter is used for compensating for the image generated by the augmented reality glasses,
   wherein the determining a compensation parameter for the first image according to the second grayscale value comprises:
   determining M target pixels in the first image and a compensation value corresponding to each of the target pixels, according to second grayscale values corresponding to all pixels in the first image, wherein M is a positive integer, comprising;
   for each pixel, determining a third grayscale value corresponding to the pixel, based on N light waves corresponding to the pixel and an attenuation value corresponding to each of the light waves, each of the light waves corresponds to a different wavelength, and N is a positive integer:
   determining an absolute value of a difference between the second grayscale value corresponding to the pixel and the third grayscale value as a grayscale difference; and
   when the grayscale difference is greater than or equal to a preset threshold. determining the pixel as a target pixel in the first image, and determining the grayscale difference as the compensation value of the target pixel.

8. The electronic device according to claim 7, wherein the determining a compensation parameter according to the second grayscale value corresponding to each pixel further comprises:
compensating for the M target pixels according to the M compensation values.

9. The electronic device according to claim 8, wherein the compensating for the M target pixels according to the M compensation values comprises:
adjusting a grayscale value of the target pixel to a target grayscale value, wherein target grayscale value is a sum of the compensation value of the target pixel and the first grayscale value of the target pixel.

10. The electronic device according to claim 8, wherein after the compensating for the M target pixels, the method further comprises:
when the augmented reality glasses generate a third image, increasing a grayscale value corresponding to the third image, wherein a grayscale value increased for the third image is the compensation value.

11. The electronic device according to claim 7, wherein the N light waves comprise a first light wave, a second light wave, and a third light wave, and the determining a third grayscale value corresponding to the pixel comprises:
determining a product of a grayscale value of the first light wave and a corresponding first attenuation value as a first sub-grayscale value;
determining a product of a grayscale value of the second light wave and a corresponding second attenuation value as a second sub-grayscale value;
determining a product of a grayscale value of the third light wave and a corresponding third attenuation value as a third sub-grayscale value; and
determining a sum of the first sub-grayscale value, the second sub-grayscale value, and the third sub-grayscale value as the third grayscale value.

12. The electronic device according to claim 7, wherein the obtaining a first grayscale value corresponding to each pixel in a first image comprises:
for each pixel of the first image, obtaining a first pixel value, a second pixel value, and a third pixel value of the pixel;
calculating a first product of the first pixel value and a corresponding first weight value, a second product of the second pixel value and a corresponding second weight value, and a third product of the third pixel value and a corresponding third weight value; and
determining an average value of the first product, the second product, and the third product as the first grayscale value of the pixel.

13. A non-transitory computer-readable storage medium, storing a program or an instruction that, when executed by a processor, causes the processor to perform an image processing method, comprising:
obtaining a first grayscale value corresponding to each pixel in a first image and a second grayscale value corresponding to each pixel in a second image, wherein the first image is an image generated by the augmented reality glasses, and the second image is an output image of the augmented reality glasses; and
determining a compensation parameter according to the second grayscale value corresponding to each pixel, wherein the compensation parameter is used for compensating for the image generated by the augmented reality glasses, wherein the determining a compensation parameter for the first image according to the second grayscale value comprises:
determining M target pixels in the first image and a compensation value corresponding to each of the target pixels, according to second grayscale values corresponding to all pixels in the first image, wherein M is a positive integer, comprising:
for each pixel, determining a third grayscale value corresponding to the pixel, based on N light waves corresponding to the pixel and an attenuation value corresponding to each of the light waves, each of the light waves corresponds to a different wavelength, and N is a positive integer;
determining an absolute value of a difference between the second grayscale value corresponding to the pixel and the third grayscale value as a grayscale difference; and
when the grayscale difference is greater than or equal to a preset threshold. determining the pixel as a target pixel in the first image, and determining the grayscale difference as the compensation value of the target pixel.

14. The non-transitory computer-readable storage medium according to claim 13, wherein the determining a compensation parameter according to the second grayscale value corresponding to each pixel further comprises:
compensating for the M target pixels according to the M compensation values.

15. The non-transitory computer-readable storage medium according to claim 14, wherein the compensating for the M target pixels according to the M compensation values comprises:
adjusting a grayscale value of the target pixel to a target grayscale value, wherein target grayscale value is a sum of the compensation value of the target pixel and the first grayscale value of the target pixel.

16. The non-transitory computer-readable storage medium according to claim 14, wherein after the compensating for the M target pixels, the method further comprises:
when the augmented reality glasses generate a third image, increasing a grayscale value corresponding to the third image, wherein a grayscale value increased for the third image is the compensation value.

17. The non-transitory computer-readable storage medium according to claim 13, wherein the N light waves comprise a first light wave, a second light wave, and a third light wave, and the determining a third grayscale value corresponding to the pixel comprises:
determining a product of a grayscale value of the first light wave and a corresponding first attenuation value as a first sub-grayscale value;
determining a product of a grayscale value of the second light wave and a corresponding second attenuation value as a second sub-grayscale value;
determining a product of a grayscale value of the third light wave and a corresponding third attenuation value as a third sub-grayscale value; and
determining a sum of the first sub-grayscale value, the second sub-grayscale value, and the third sub-grayscale value as the third grayscale value.

18. The non-transitory computer-readable storage medium according to claim 13, wherein the obtaining a first grayscale value corresponding to each pixel in a first image comprises:
for each pixel of the first image, obtaining a first pixel value, a second pixel value, and a third pixel value of the pixel;

calculating a first product of the first pixel value and a corresponding first weight value, a second product of the second pixel value and a corresponding second weight value, and a third product of the third pixel value and a corresponding third weight value; and
determining an average value of the first product, the second product, and the third product as the first grayscale value of the pixel.

* * * * *